United States Patent [19]

Weih

[11] Patent Number: 5,175,215
[45] Date of Patent: Dec. 29, 1992

[54] ADHESIVE COMPOSITIONS BASED ON BLOCK COPOLYMER ADDUCTS

[75] Inventor: Mark A. Weih, Cambridge Springs, Pa.

[73] Assignee: Lord Corporation, Erie, Pa.

[21] Appl. No.: 657,929

[22] Filed: Feb. 20, 1991

[51] Int. Cl.⁵ .......................................... C08F 287/00
[52] U.S. Cl. ................................... 525/292; 525/276; 525/288; 525/314; 525/315; 524/552
[58] Field of Search .............. 525/276, 288, 292, 314, 525/315

[56] References Cited

U.S. PATENT DOCUMENTS

| | | | |
|---|---|---|---|
| 3,444,154 | 5/1969 | Shatz | 525/292 |
| 3,483,272 | 12/1969 | Hindersinn | 525/292 |
| 3,494,985 | 2/1970 | Hindersinn et al. | 525/292 |
| 3,640,941 | 2/1972 | Findley et al. | 260/33.6 A |
| 4,795,778 | 1/1989 | Bond et al. | 524/551 |

Primary Examiner—James J. Seidleck
Assistant Examiner—Vasu S. Jagannathan
Attorney, Agent, or Firm—W. Graham Buie

[57] ABSTRACT

A Diels-Alder adduct of a halogenated cyclic conjugated diene and a block copolymer of styrene and butadiene which is particularly useful in adhesive compositions. The Diels-Alder adduct has a halogen content of between about 30 and 45, preferably between about 34 and 40, percent by weight. The halogen content of the adduct is crucial to the performance of the adduct in adhesive compositions. Hexachlorocylopentadiene is a preferred halogenated cyclic conjugated diene for preparing the adduct and either diblock or triblock styrene-butadiene copolymers may be utilized.

9 Claims, 2 Drawing Sheets

ADHESIVE COMPOSITIONS BASED ON BLOCK COPOLYMER ADDUCTS

FIELD OF THE INVENTION

The present invention relates to novel polymeric materials which are useful in various applications including adhesive compositions. More specifically, the present invention relates to Diels-Alder adducts of halogenated cyclic conjugated dienes and block copolymers of styrene and butadiene.

BACKGROUND OF THE INVENTION

Numerous polymers and corresponding adhesive compositions have been previously developed which are useful for bonding various surfaces. One particular application in which adhesive compositions are utilized is the injection molding of an elastomeric material onto a metal surface. In this application, an adhesive composition is applied to the metal surface after which the preheated elastomeric material is forced onto the surface of the metal under sufficient pressure. It is important for the adhesive to maintain relative stability with respect to the metal surface during the elastomeric injection process, in order to avoid sweeping of the adhesive which may result in bare spots on the metal surface that will not sufficiently bond with the elastomeric material. In addition to maintaining stability during the injection process, it is desirable for the adhesive to maintain sufficient cohesive strength at elevated temperatures.

One adhesive for bonding vulcanized rubber to metal surfaces is described in U.S. Pat. No. 3,640,941. This adhesive contains a graft polymer formed from the combination of polybutadiene or halogenated polybutadiene and substituted cyclopentadiene monomer, dibasic lead phosphite, resorcinol, and a volatile organic solvent for the graft polymer. Another adhesive composition is disclosed in U.S. Pat. No. 4,795,778 and relates to a Diels-Alder adduct of a chlorinated cyclic conjugated diene and a 1,2-polybutadiene homopolymer having a vinyl content in the range from 88 to 98 percent and a halogen content in the range from 26 to 35 weight percent. The Diels-Alder adduct is utilized in combination with an inert solvent for bonding elastomeric materials.

Many traditional adhesive compositions such as those described above do not maintain sufficient integrity while in contact with the metal surface during injection molding of a hot elastomeric material. Furthermore, many traditional adhesive compositions do not maintain sufficient cohesive strength between the elastomer and metal surface at high temperatures. A need therefore exists for an adhesive composition that would overcome these problems associated with many of the currently available adhesive compositions.

SUMMARY OF THE INVENTION

The present invention is a polymeric material which, when utilized in adhesive compositions, provides for structural adhesive stability during injection molding processes and provides for substantial cohesive strength at elevated temperatures. The novel polymeric material of the present invention comprises a Diels-Alder adduct of a halogenated cyclic conjugated diene and a block copolymer of styrene and butadiene wherein the Diels-Alder adduct has a halogen content of between about 30 and 45 percent by weight. It has presently been discovered that a Diels-Alder adduct prepared from certain amounts of the cyclic conjugated dienes and block copolymers disclosed herein, such that the resulting Diels-Alder adduct has a halogen content of between about 30 and 45 percent by weight, possesses an unusual ability to maintain integrity during injection molding processes, exhibits excellent elastomer bonding properties, and retains significant cohesive strenghts at elevated temperatures.

DETAILED DESCRIPTION OF THE INVENTION

Figure 1:
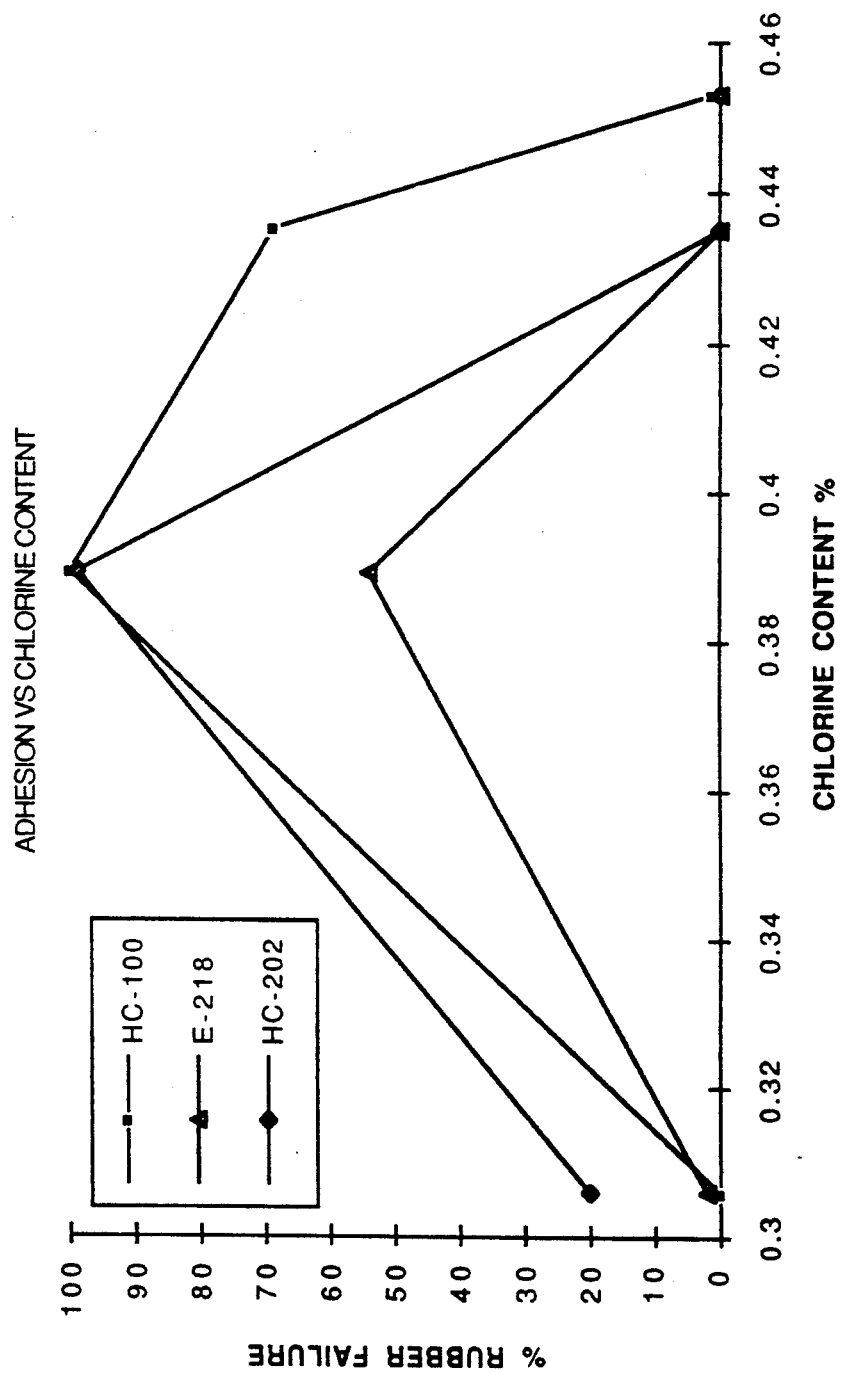
FIG. 1 is a graphic representation of the data generated from the adhesion tests in Example 1 and shows percent rubber failure versus chlorine content for Samples 1-4.

The novel polymeric material of the present invention is a Diels-Alder adduct of a halogenated cyclic conjugated diene and a block copolymer of styrene and butadiene wherein the Diels-Alder adduct has a halogen content of between about 30 and 45, preferably between about 34 and 40, percent by weight.

The halogenated cyclic conjugated dienes which can be utilized to prepare the Diels-Alder adducts of the present invention can be represented by the formula:

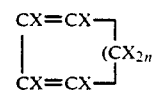

wherein X can be chlorine, bromine, or fluorine, and is preferably chlorine. The interger n can be 1, 2, or 3, and is preferably 1. The halogenated cyclic conjugated dienes are readily prepared by well-known methods and at at least one, hexachlorocyclopentadiene, is a well-known article of commerce. Other representative dienes include hexafluorocyclopentadiene, hexabromocyclopentadiene, 5,5-difluorotetrachlorocyclopentadiene and 5,5-dibromotetrachlorocyclopentadiene. Hexachlorocyclopentadiene is presently preferred for use in the present invention.

The halogenated cyclic conjugated dienes of the present invention are utilized in amounts sufficient to result in a Diels-Alder adduct containing from about 40 to 60, preferably from about 44 to 55, percent by weight of halogenated cyclic conjugated diene. This will result in a Diels-Alder adduct having a halogen content in the range from about 30 to 45, preferably from about 34 to 40, percent by weight. In order to prepare a polymeric material which exhibits the bonding characteristics disclosed herein, it is essential to ensure that the conjugated diene and corresponding halogen contents specified above are achieved in the final adduct.

The block copolymers of styrene (S) and butadiene (B) can be either diblock (SB) or triblock (SBS) copolymers. It is presently preferred for purposes of the present invention to utilize block copolymers which contain from about 20 to 40, preferably from about 25 to 33, percent by weight styrene. It is presently particularly preferred to utilize a triblock copolymer which contains between about 26 and 30 percent by weight styrene.

The styrene-butadiene block copolymers of the present invention can be prepared by methods such as anionic coupling reactions which are well known to those skilled in the art and which are described in *The Encyclopedia of Polymer Science and Engineering*, 2nd ed., John Wiley & Sons, New York, 1985, Vol. 2, pp. 324-434, (see especially p. 326).

Other additional ingredients may be utilized in the preparation of the present Diels-Alder adducts. For example, free radical scavengers may be added in order to prevent radical induced crosslinking, as is known in the art. A free radical scavenger, if utilized, is typically employed in an amount ranging from about 0.05 to 0.5 percent by weight of the total reaction mixture utilized to prepare the adducts. Also, common heat-activated unsaturated elastomer crosslinkers such as quinone dioxime, dibenzoquinone dioxime, and 1,2,4,5-tetrachlorobenzoquinone can be utilized when forming the adduct of the present invention. Any such crosslinkers may be employed in an amount ranging from about 1 to 10 percent by weight of the total reaction mixture utilized to prepare the adducts. Heat-activated crosslinkers are typically needed when molding temperatures are low, molding times are short, prebake times are long, and/or prebake temperatures are high.

The styrene-butadiene block copolymers of the present invention are utilized in amounts sufficient to produce a final Diels-Alder adduct containing from about 60 to 40, preferably from about 56 to 45, percent by weight of block copolymer. This will result in a Diels-Alder adduct having a halogen content in the range of from about 30 to 45, preferably from about 34 to 40, percent by weight. As stated above, it is extremely important to utilize appropriate amounts of the block copolymers and conjugated dienes to create a Diels-Alder adduct having the specific halogen content described above.

The Diels-Alder adducts of the present invention are readily prepared by conventional techniques well known in the field of Diels-Alder reactions. In general, the Diels-Alder adduction between the halogenated cyclic conjugated diene and the styrene-butadiene block copolymer is effected in an organic solvent such as xylene in relative amounts such that the stoichiometric ratio between the halogenated cyclic conjugated diene and the unsaturation of the block copolymer is in the range of 0.01 to 1. Although xylene is preferred, other solvents such as ethyl benzene, orthodichlorobenzene, and 1,2,4-trichlorobenzene may be utilized. The mixture is heated at temperatures in the range from about 100° C. to 200° C. The reaction is continued for a time sufficient to substantially react the halogenated cyclic conjugated diene and the block copolymer to provide an adduct having a halogen content in the range from about 30 to 45, preferably about 34 to 40, percent by weight, based on the total weight of the adduct. The halogen content of the adduct can be determined by known analytical procedures, such as Schoniger combustion.

The Diels-Alder adducts so prepared may be utilized as adhesive compositions by dissolving the adduct (after purification and isolation from the reaction mixture) in an appropriate solvent. Typical solvents useful for preparing the adhesive composition include xylene, methyl isobutyl ketone, methyl ethyl ketone, benzene, toluene, hexane, naptha, and mixtures thereof, with a 2:1 weight blend of methyl isobutyl ketone and xylene being presently preferred. The solvent is utilized in an amount sufficient to afford an adhesive lacquer having a viscosity in the range from about 100 to 5000, preferably about 125 to 400, centipoises at a total solids content in the range from about 5 to 40, preferably about 10 to 35, percent.

The Diels-Alder adducts of the present invention can also be applied as an aqueous dispersion. An aqueous dispersion is typically made by adding sufficient quantities of typical dispersing aids such as ethoxylated aryl sulfonic acid derivatives to the solvent solution, adding water under high shear conditions to form a dispersion, and removing the solvent by vacuum stripping under heat. The resulting dispersion can then be used to apply the adduct in a manner similar to the solvent-based solutions.

Various conventional additives, such as fillers, colorants, supplemental film formers and the like, can be included in the adhesive compositions of the present invention without deleteriously affecting the advantageous properties thereof. Quite often, the inclusion of additives may enhance the viscosity and other properties desirably from the standpoint of application of the adhesive. Representative of suitable filler materials are finely divided substantially inert solid materials such as carbon black and titanium dioxide. Such conventional additives can be used in amounts corresponding to the customary ranges at which these additives are normally employed, e.g., in the range of about 15 to about 100 parts by weight per 100 parts by weight of the Diels-Alder adduct.

The adhesive compositions of the present invention have been found to be particularly suitable for bonding a wide variety of elastomeric materials, including both vulcanized and vulcanizable elastomeric materials to themselves or to other substrates, particularly inorganic substrates. Elastomers which can be bonded include natural rubber, polychloroprene rubber, styrene-butadiene rubber, nitrile rubber, thermoplastic elastomers, and the like. Substrates other than the elastomers per se which can be effectively bonded include fabrics such as fiberglass, polyamides, polyesters, aramides, e.g., KEVLAR, (E.I. duPont de Nemours and Co.), and the like; and metals and their alloys such as steel, stainless steel, lead, aluminum, copper, brass, bronze, Monel metals, nickel, zinc, and the like, including treated metals such as phosphatized steel, galvanized steel, and the like; glass; ceramics; and the like. It is presently preferred to utilize the present adhesive compositions to bond elastomeric materials to metal surfaces.

The adhesive compositions of the present invention are readily applied by conventional means, such as by dipping, brushing, spraying, etc., to either or both of the surfaces to be joined. Where a primer is employed the compositions can be applied directly over the primer. Generally, the adhesive compositions are allowed to dry after application to remove the solvent. This can be accomplished at ambient conditions in 30 to 60 minutes. Solvent evaporation rate can be increased by the use of heat, forced air, or both. As a general rule, forced drying temperatures should be maintained below 95° C.

The surfaces to be bonded are brought together with the dried adhesive face therebetween, and the assembly is heated in accordance with conventional practices. The exact conditions will depend upon the particular elastomer being bonded and whether or not it is cured. If the rubber is uncured, and curing is to be effected during bonding, the conditions will be dictated by the rubber composition and will generally be at a temperature of from 140° C. to 200° C. for from 5 to 60 minutes. If the rubber is already cured, the bonding temperature may range from 90° C. to 180° C. for from 15 to 120 minutes.

When bonding an elastomeric material to a metal surface, it is sometimes desirable or necessary (e.g., in injection molding procedures) to subject the adhesive-coated metal surface to a precure heat exposure time ranging from about two to ten minutes at a temperature between about 130° C. and 190° C. As stated earlier, the addition of a heat-activated unsaturated elastomer crosslinker such as quinone dioxime to the adhesive composition may be desirable in circumstances involving precure or prebake conditions. The use of such a crosslinker will enhance the ability of the adhesive composition to maintain integrity and bonding effectiveness throughout the precure period.

The following examples are provided for purposes of illustration only and are not intended to limit in any manner the scope of the present invention which is defined by the claims.

EXAMPLE 1

Hexachlorocyclopentadiene/styrene-butadiene triblock copolymer adducts are prepared by charging a four-necked 3L reactor equipped with stirring, $N_2$, reflux condenser, thermometer, and immersed in a heated oil bath, with the following ingredients:

| % Charged | Grams Charged | Ingredients |
| --- | --- | --- |
| 22.1% | 568.8 gms | Triblock SBS copolymer containing 28% styrene by weight[a] |
| 52.5% | 1,350.0 gms | Hexachlorocyclopentadiene |
| 0.2% | 5.6 gms | Free-radical scavenger[b] |
| 25.2% | 649.6 gms | Xylene |
| 100.0% | 2,574.0 gms | |

[a]KRATON D1102 (Shell Chemical Company)
[b]IRGANOX 1093 (Ceiba-Geigy Corporation)

The reactor is heated to reflux at approximately 145° C. and samples are removed at the time intervals shown below. The samples are precipitated in methanol, filtered, and redissolved in xylene three times to remove unreacted hexachlorocyclopentadiene. The samples are then precipitated in methanol, filtered, and vacuum dried for 8 hours at 50° C. The samples are then redissolved in a 2:1 wt. blend of methyl isobutyl ketone and xylene to a solids content of 25%.

The samples are analyzed for chlorine content with the following results:

| Sample | 1 | 2 | 3 | 4 |
| --- | --- | --- | --- | --- |
| Cook time (hrs) | 7.5 | 15 | 22.5 | 30 |
| % Chlorine (weight %) | 30.6 | 38.9 | 43.5 | 45.3 |

These samples are coated onto grit blasted steel primed with a conventional chlorinated rubber-based metal primer. Film thickness of the samples are maintained at 0.5-1.0 mils. The coated coupons are bonded to HC-100 (55-60 durometer Shore A natural rubber) for 25 minutes at 307° F., E-218 (55-60 durometer Shore A semi-EV cure natural rubber) for 15 minutes at 307° F. and HC-202 (60-65 durometer Shore A styrene butadiene rubber) for 30 minutes at 307° F. Adhesion is measured using ASTM D429-B (modified to a 45° peel, and pulled at 20"/min).

In the data given below, reference is made to failure in the rubber body (R), failure between the adhesive composition and the rubber (RC), and failure between the adhesive composition and the primer (CP). Failure is expressed in terms of percent, and a high percent of failure in the rubber is desirable since this indicates that the adhesive bond is stronger than the rubber itself. The pounds of pull indicate the pounds of force per lineal inch needed to pull the rubber body from the metal. The results of the bonding test are given below.

| Sample | 1 | 2 | 3 | 4 |
| --- | --- | --- | --- | --- |
| HC-100 | | | | |
| Lbs. Pull | 26 | 51 | 64 | 21 |
| % R Failure | 0 | 100 | 69 | 1 |
| % RC Failure | 0 | 0 | 31 | 99 |
| % CP Failure | 100 | 0 | 0 | 0 |
| E-218 | | | | |
| Lbs. Pull | 33 | 71 | 21 | 20 |
| % R Failure | 2 | 54 | 0 | 0 |
| % RC Failure | 0 | 46 | 100 | 100 |
| % CP Failure | 98 | 0 | 0 | 0 |
| HC-202 | | | | |
| Lbs. Pull | 77 | 135 | 45 | 34 |
| % R Failure | 20 | 99 | 0 | 0 |
| % RC Failure | 0 | 1 | 100 | 100 |
| % CP Failure | 80 | 0 | 0 | 0 |

Figure 2:
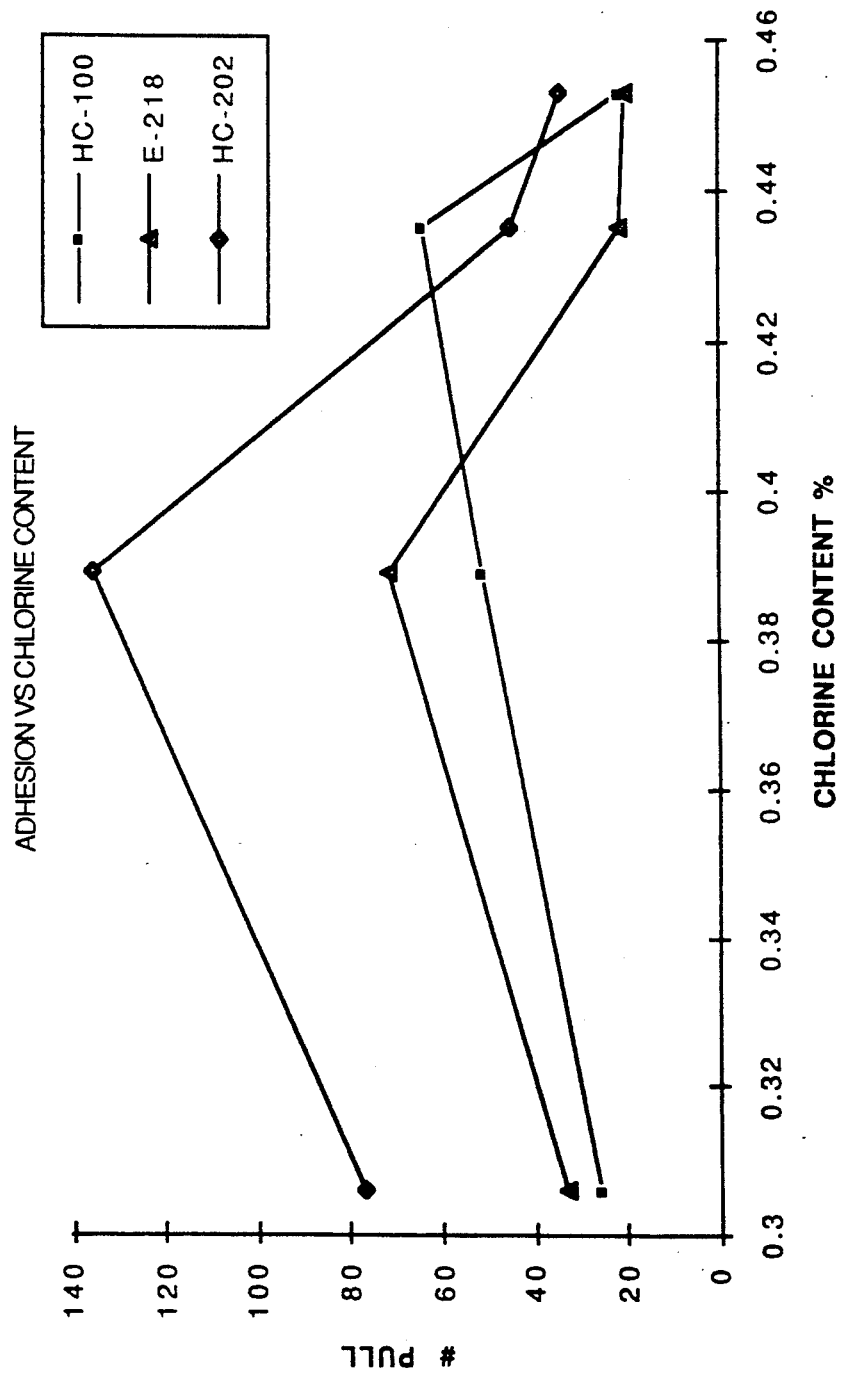
FIG. 2 is a graphic representation of the data generated from the adhesion testes in Example 1 and shows pounds of pull versus chlorine content for Samples 1-4.

FIGS. 1 and 2 show the percent rubber failure and pull values, respectively, as a function of chlorine content of the final adduct for samples 1-4.

EXAMPLE 2

Hexachlorocyclopentadiene/styrene-butadiene diblock copolymer adducts are prepared by charging a four-necked 5L reactor equipped with stirring, $N_2$, reflux condenser, thermometer, and immersed in a heated oil bath, with the following ingredients:

| % Charged | Grams Charged | Ingredients |
| --- | --- | --- |
| 25.0% | 900.4 gms | Diblock SB copolymer containing 30% styrene by weight[a] |
| 46.2% | 1,662.3 gms | Hexachlorocyclopentadiene |
| 0.2% | 8.9 gms | Free Radical Scavenger[b] |
| 28.6% | 1,028.4 gms | Xylene |
| 100.0% | 3,600.0 | |

[a]KRATON D1118X (Shell Chemical Company)
[b]IRGANOX 1076 (Ceiba-Geigy Corporation)

The reactor is heated to reflux at approximately 145° C. and samples are removed at the time intervals (corresponding to respective chlorine contents) shown below:

| Sample #: | 5 | 6 | 7 | 8 |
| --- | --- | --- | --- | --- |
| Time (Hours): | 11 | 13 | 15 | 17 |
| % Chlorine: | 31.1 | 33.0 | 35.5 | 36.5 |

The samples are cleaned of residual hexachlorocyclopentadiene as in Example 1. The samples are then coated onto grit-blasted steel primed with a conventional chlorinated rubber-based metal primer. The coated coupons are tested for adhesion to HC-100, E-218, and HC-202 using the modified ASTM D429-B peel test described above, with the following results:

| Sample | 5 | 6 | 7 | 8 |
| --- | --- | --- | --- | --- |
| HC-100 | | | | |

| Sample | 5 | 6 | 7 | 8 |
| --- | --- | --- | --- | --- |
| Lbs. Pull | 53 | 47 | 54 | 84 |
| % R Failure | 11 | 12 | 100 | 100 |
| % RC Failure | 70 | 0 | 0 | 0 |
| % CP Failure | 19 | 88 | 0 | 0 |
| E-218 | | | | |
| Lbs. Pull | 49 | 49 | 55 | 56 |
| % R Failure | 0 | 10 | 100 | 98 |
| % RC Failure | 0 | 0 | 0 | 2 |
| % CP Failure | 100 | 90 | 0 | 0 |
| HC-202 | | | | |
| Lbs. Pull | 63 | 125 | 135 | 148 |
| % R Failure | 1 | 66 | 66 | 100 |
| % RC Failure | 0 | 0 | 0 | 0 |
| % CP Failure | 99 | 34 | 34 | 0 |

The above data clearly shows the significant effect of percent halogen content on the performance of the present Diels-Alder adducts in adhesive compositions.

What is claimed is:

1. A composition of matter comprising a Diels-Alder adduct of a halogenated cyclic conjugated diene and a block copolymer of styrene and butadiene wherein the Diels-Alder adduct has a halogen content of between about 30 and 45 percent by weight based on the total weight of the adduct and wherein the block copolymer contains from about 20 to 40 percent by weight styrene.

2. A composition of matter according to claim 1 wherein the halogen content is between about 34 and 40 percent by weight.

3. A composition of matter according to claim 1 wherein the halogenated cyclic conjugated diene is selected from the group consisting of hexachlorocyclopentadiene, hexafluorocyclopentadiene, hexabromocyclopentadiene, 5,5-difluorotetrachlorocyclopentadiene and 5,5-dibromotetrachlorocyclopentadiene.

4. A composition of matter according to claim 3 wherein the halogenated cyclic conjugated diene is hexachlorocyclopentadiene.

5. A composition of matter according to claim 1 wherein the styrene-butadiene block copolymer is selected from the group consisting of diblock styrene-butadiene copolymers, and triblock styrene-butadiene copolymers.

6. A composition of matter according to claim 5 wherein the styrene-butadiene block copolymer is a diblock copolymer.

7. A composition of matter according to claim 5 wherein the styrene-butadiene block copolymer is a triblock copolymer.

8. A composition of matter according to claim 7 wherein the styrene-butadiene block copolymer has a styrene content of between about 26 and 30 percent by weight.

9. A composition of matter according to claim 1 wherein the styrene content is between about 25 and 33 percent by weight.

* * * * *